(12) United States Patent
Karve

(10) Patent No.: US 12,545,267 B2
(45) Date of Patent: Feb. 10, 2026

(54) METHOD TO IMPROVE RIDE COMFORT AND REDUCE DRIVER AND PASSENGER ANXIETY IN A VEHICLE

(71) Applicants: Steering Solutions IP Holding Corporation, Auburn Hills, MI (US); Continental Automotive Systems, Inc., Auburn Hills, MI (US)

(72) Inventor: Omkar Karve, Farmington Hills, MI (US)

(73) Assignees: Steering Solutions IP Holding Corporation, Auburn Hills, MI (US); Continental Automotive Systems Inc., Auburn Hills, MI (US)

( * ) Notice: Subject to any disclaimer, the term of this patent is extended or adjusted under 35 U.S.C. 154(b) by 307 days.

(21) Appl. No.: 17/734,262

(22) Filed: May 2, 2022

(65) Prior Publication Data
US 2023/0347912 A1    Nov. 2, 2023

(51) Int. Cl.
*B60W 50/00*    (2006.01)
*B60Q 3/70*    (2017.01)
(Continued)

(52) U.S. Cl.
CPC ......... *B60W 50/0098* (2013.01); *B60Q 3/735* (2022.05); *B60R 21/01* (2013.01); *B60W 30/143* (2013.01); *B60W 40/08* (2013.01); *B60W 50/16* (2013.01); *B60R 2021/01272* (2013.01); *B60W 2040/0818* (2013.01); *B60W 2050/143* (2013.01); *B60W 2050/146* (2013.01);
(Continued)

(58) Field of Classification Search
CPC .......... B60W 50/0098; B60W 30/143; B60W 40/08; B60W 50/16; B60W 2040/0818; B60W 2050/143; B60W 2050/146; B60W 2520/125; B60W 2540/225; B60W 2540/229; B60W 50/14; B60Q 3/735; B60Q 9/008; B60R 21/01; B60R 2021/01272; B60R 16/037
See application file for complete search history.

(56) References Cited

U.S. PATENT DOCUMENTS 10,046,743 B2    8/2018    Jonasson et al.
10,093,322 B2 *  10/2018   Gordon ................ H04B 1/3822
(Continued)

FOREIGN PATENT DOCUMENTS

DE    112016002832 T5 *    3/2018    ............ B60W 30/16
DE    102020111250 A1    10/2020
DE    102019006685 A1    3/2021

OTHER PUBLICATIONS

Machine translation of DE112016002832 (Year: 2018).*
(Continued)

*Primary Examiner* — Anne Marie Antonucci
*Assistant Examiner* — Jordan T Smith
(74) *Attorney, Agent, or Firm* — Ingrassia Fisher & Lorenz, LLP

(57) ABSTRACT

A number of variations may include a system or method of monitoring vehicle control actions and communicating upcoming control actions, such as deceleration or lateral movement, to vehicle occupants prior to occurrence of the control action such that occupants are aware of upcoming vehicle control actions and occupant stress or anxiety may be reduced during operation of a vehicle.

20 Claims, 1 Drawing Sheet

(51) Int. Cl.
  *B60R 21/01*   (2006.01)
  *B60W 30/14*   (2006.01)
  *B60W 40/08*   (2012.01)
  *B60W 50/16*   (2020.01)
  *B60W 50/14*   (2020.01)
(52) U.S. Cl.
  CPC . *B60W 2520/125* (2013.01); *B60W 2540/225* (2020.02); *B60W 2540/229* (2020.02)

(56) References Cited

U.S. PATENT DOCUMENTS

| | | | |
|---|---|---|---|
| 10,372,130 B1* | 8/2019 | Kaushansky | B60K 35/26 |
| 2015/0246673 A1* | 9/2015 | Tseng | B60W 60/0013 |
| | | | 701/23 |
| 2018/0072323 A1* | 3/2018 | Gordon | H04B 1/3822 |
| 2018/0093676 A1* | 4/2018 | Emura | B60R 16/02 |
| 2020/0269848 A1* | 8/2020 | Kang | G06N 20/00 |
| 2020/0339157 A1* | 10/2020 | Yurdana | B60K 35/22 |
| 2020/0383622 A1* | 12/2020 | Ali | A61B 5/113 |
| 2021/0380117 A1* | 12/2021 | Gonzalez | B60W 30/12 |
| 2022/0144086 A1* | 5/2022 | Sakurai | B60K 35/10 |

OTHER PUBLICATIONS

German Office Action dated Jan. 27, 2023; Application No. 10 2022 116636.8; Applicant: Continental Automotive Systems, Inc. et al; 17 pages.

* cited by examiner

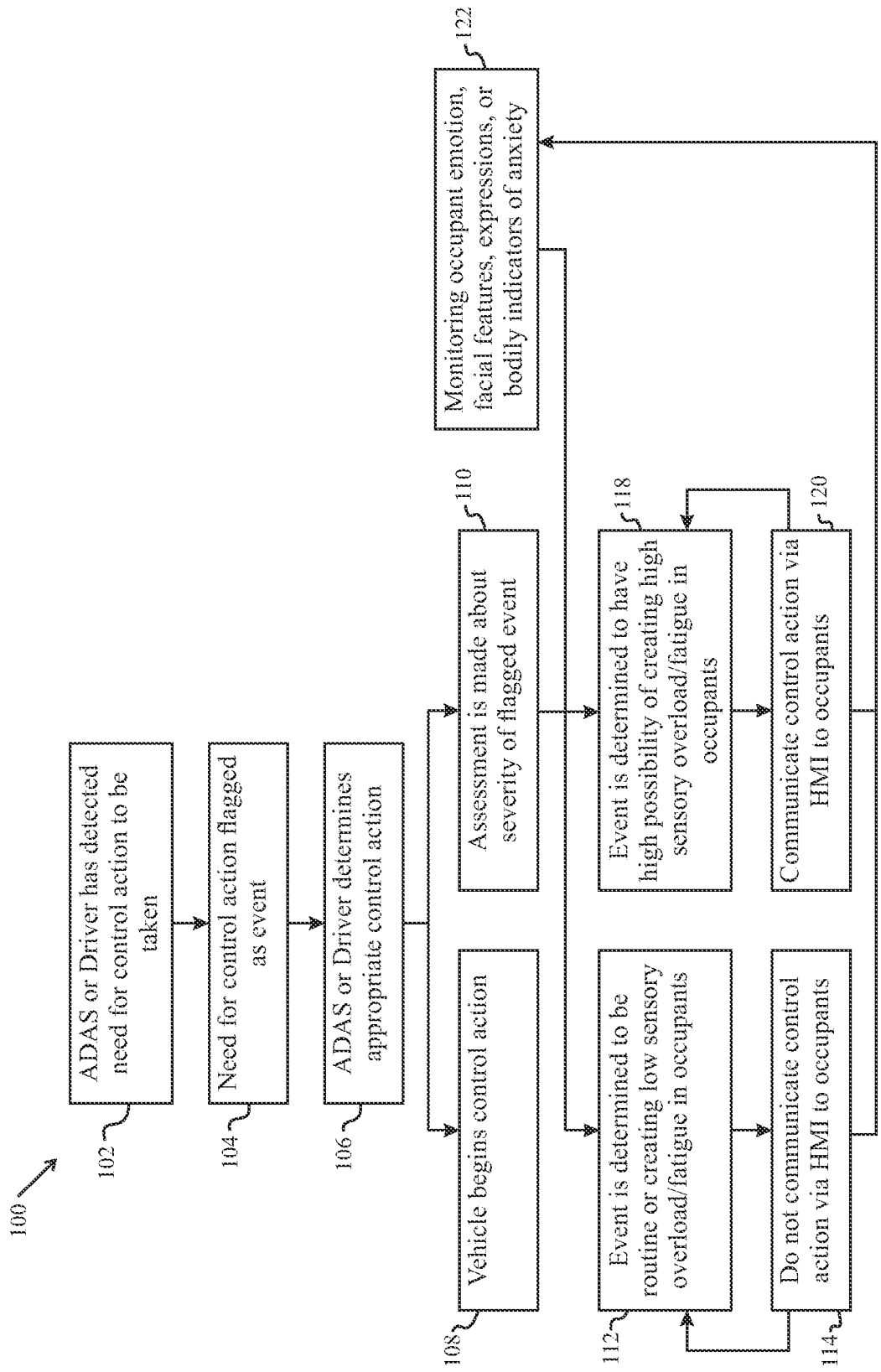

METHOD TO IMPROVE RIDE COMFORT AND REDUCE DRIVER AND PASSENGER ANXIETY IN A VEHICLE

TECHNICAL FIELD

The field to which the disclosure generally relates to systems manipulating human-machine interfaces within a vehicle.

BACKGROUND

Vehicles may include advanced driver-assistance systems or manual driving systems that perform control actions, such as acceleration, braking, or turning, that may increase driver or rider anxiety when control actions occur without prior driver or rider knowledge.

SUMMARY OF ILLUSTRATIVE VARIATIONS

A number of variations may include a system or method for communicating to vehicle drivers or passengers, via human-machine interface (HMI) systems, that control actions are active or are about to be active within a vehicle while minimizing sensory overload for vehicle drivers or passengers.

A number of variations may include a system or method of monitoring vehicle control actions and communicating upcoming control actions to vehicle occupants prior to occurrence of the control action such that an occupant is aware of upcoming vehicle control actions, thereby reducing occupant anxiety.

Other illustrative variations within the scope of the invention will become apparent from the detailed description provided hereinafter. It should be understood that the detailed description and specific examples, while disclosing variations of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein:

FIG. 1 depicts an illustrative variation of a block diagram of a system and method to improve ride comfort and reduce driver and passenger anxiety in a vehicle.

DETAILED DESCRIPTION OF ILLUSTRATIVE VARIATIONS

The following description of the variations is merely illustrative in nature and is in no way intended to limit the scope of the invention, its application, or uses.

As used herein, "operating environment" may refer broadly to roadways, highways, streets, paths, parking lots, parking structures, tunnels, bridges, traffic intersections, residential garages, or commercial garages. It is contemplated that the operating environment may include any location or space accessible by a vehicle.

As used herein, "road," even when modified by a descriptive adjective may refer to a traditional driving surface road such as but not limited to a concrete or asphalt road but may also refer to any driving surface or medium along which or through which a vehicle for cargo or passengers may travel such as but not limited to water, ice, snow, dirt, mud, air or other gases, or space in general.

As used herein, "controller" and variations on that term may refer broadly to a system configured to execute the processes and steps described in this disclosure. A controller may include one or more processors in operable communication with memory through a system bus that couples various system components such as input/output (I/O) devices. Processors suitable for the execution of computer readable program instructions or processes may include both general and special purpose microprocessors and any one or more processors of any digital controller. A controller may be a combination of components including a processor, memory, data storage, and the like in operable communication with a variety of systems within a vehicle such as, but not limited to, electronic steering systems, traction control systems, electronic braking systems, propulsion systems, advanced driver assistance systems (ADAS), or the like.

A number of variations may include a system or method of identifying potentially anxiety inducing events, monitoring vehicle control actions, and communicating upcoming control actions, such as deceleration or lateral movement, to vehicle occupants prior to occurrence of the control action such that an occupant is aware of upcoming vehicle control actions, thereby reducing occupant anxiety. The system and method may be performed via computer readable program instructions or processes in operable communication with a variety of systems within a vehicle such as, but not limited to, motion controllers, electronic steering systems, traction control systems, electronic braking systems, propulsion systems, ADAS, or the like.

As a non-limiting example, a vehicle traveling on a road or in a typical operating environment may approach an obstacle or change trajectory requiring deceleration of the vehicle. This may be the case where a vehicle is utilizing autonomous driving functionality, ADAS, or is being controlled by a human driver. The driver or passengers may experience increased anxiety due to a variety of factors influencing travel including unexpected deceleration. Alternatively, driver or passengers may experience increased anxiety due to perceived lack of timely deceleration as a vehicle approaches an obstacle or change in trajectory requiring deceleration of the vehicle. Increased anxiety may be a result of lack of positive communication from the vehicle or operating environment that tells occupants about the current control action being taken by the driver or the system.

As a non-limiting example, a deceleration control action that the system or a human driver may take in response to an oncoming obstacle may take a small amount of time before which a negative deceleration is felt by the occupants, such as passengers, either by visual means or by means of fluid movement in inner ears or seat of pants. This small amount of time in which a vehicle occupant does not know or understand control actions about to occur may lead to rise in anxiety. The system may provide a method for communicating to occupants via HMI what is happening in a non-obtrusive way that brakes are being applied or deceleration is being demanded by the autonomous system or the driver.

Communication to occupants via HMI may include gentle tightening of a seatbelt, illumination of a light source integrated into a vehicle dash, providing audio cues, displaying intending control action on a graphical user interface of a display within a vehicle dash, vibrating a vehicle seat or portion of a seat to indicate lateral movement control actions. Any arrangement of the aforementioned communications may be used individually or in combination to indicate various upcoming control actions.

According to some embodiments, the system may assess severity of upcoming events in order to determine whether they are routine or may have a high possibility of creating sensory overload, anxiety, or sensory fatigue in an occupant. Additionally, the assessment function may determine whether to let passengers know about upcoming control actions by integrating with passenger tracking inputs from various vehicles systems. As a non-limiting example, passenger tracking inputs may determine that vehicle occupants are not looking through a vehicle windshield and the system may determine that no indication of an upcoming control action is required, as the occupants would reasonably not anticipate any upcoming control action. Advanced functions such as passenger emotion detection, via artificial intelligence based facial recognition, can lead to less or more communication by the system to occupants distracted or engaged in other activities.

FIG. 1 depicts an illustrative variation of a block diagram of a system 100 and method to improve ride comfort and reduce driver and passenger anxiety in a vehicle. The system 100 may include a vehicle including ADAS or an occupant driver which has taken the action 102 of determining that a control action, such as deceleration or acceleration or lateral movement, is required for continuing safe travel. The system may perform an action 104 including flagging the need for control action as an event. The system may perform an action 106 including determining the appropriate control action to continue safe function and travel of the vehicle. The appropriate control action may include commands, such as actuator commands, communicated to motion controllers, electronic steering systems, traction control systems, electronic braking systems, propulsion systems, ADAS, or the like. The system may perform an action 108 by initiating the control action or completing the control action.

The system may perform an action 110 including assessing the severity of the flagged event and determining 112 that the flagged event is routine, expected, or would otherwise create low anxiety, sensory overload, or sensory fatigue in vehicle occupants. In such a case, the system 100 may perform action 114 of not communicating the upcoming control action via HMI to vehicle occupants. As a non-limiting example, the system may determine that a routine control action such as slight deceleration or implementation of a braking system is required to maintain vehicle speed on a road having a down-hill slope or where the vehicle may need to decelerate only slightly to maintain cruise control speed. As a non-limiting example, the system may determine that routine control action such as slight lateral adjustment is required for the vehicle is implementing lane keeping systems or other ADAS systems. In such cases, control action may be taken by the driver or ADAS systems to adjust trajectory or speed without the need for communicating to vehicle occupants that an upcoming control action is about to be taken.

The system may perform an action 110 including assessing the severity of the flagged event and determining 118 that the flagged event is non-routine, unexpected, or would otherwise create high anxiety, sensory overload, or sensory fatigue in vehicle occupants. In such a case, the system 100 may perform action 120 of communicating the upcoming control action via HMI to vehicle occupants. Occupant anxiety may be reduced by first indicating via the HMI that a control action is about to occur before the control action is initiated or completed. In determining whether the control action should be communicated to the passengers or driver, a system may monitor occupant emotions or facial features or expressions, or other bodily indicators that can detect anxiety levels may be used 122. Monitored occupant activity or anxiety 122 may be utilized to determine that the flagged event is routine, expected, or would otherwise create low anxiety, sensory overload, or sensory fatigue in vehicle occupants 112 or that the flagged event is non-routine, unexpected, or would otherwise create high anxiety, sensory overload, or sensory fatigue in vehicle occupants 118. Monitored occupant activity or anxiety 122 may include monitoring vehicle occupant attention via at least one passenger tracking input, such as a camera or sensor directed toward vehicle occupant(s) including tracking at least one of vehicle occupant head position or eye movement to determine whether the occupant is paying attention to the control actions being taken by the ADAS system or the driver. The HMI may use this information to determine which occupant to communicate this control action to. As a non-limiting example, the system may determine, via passenger tracking inputs, that occupant(s) are distracted and not looking forward towards the direction of travel or away from an HMI. In such a case, the system may use an auditory cue rather than a visual cue to indicate an upcoming control action.

The following description of variants is only illustrative of components, elements, acts, product, and methods considered to be within the scope of the invention and are not in any way intended to limit such scope by what is specifically disclosed or not expressly set forth. The components, elements, acts, product, and methods as described herein may be combined and rearranged other than as expressly described herein and still are considered to be within the scope of the invention.

According to variation 1, a product may include at least one controller; a memory that stores computer-executable components; and a processor that executes the computer-executable components stored in the memory. The computer-executable components may include determining that a control action is required for continuing function and travel of a vehicle; flagging the need for control action as an event; determining the control action to continue function and travel of the vehicle; initiating performing the control action; assessing the severity of the flagged event; determining that the flagged event is non-routine; monitoring vehicle occupant attention via at least one passenger tracking input; and communicating the initiated control action via human-machine-interface to vehicle occupants.

Variation 2 may include a product as in variation 1, further including completing the control action.

Variation 3 may include a product as in any of variations 1 through 2, wherein determining that the flagged event is non-routine includes determining that the control action to continue function and travel of the vehicle would create at least one of high anxiety, sensory overload, or sensory fatigue in vehicle occupants.

Variation 4 may include a product as in any of variations 1 through 3, wherein determining that the flagged event is non-routine includes calculating at least one of an estimated deceleration rate or an estimated acceleration rate; and comparing at least one of a predetermined deceleration rate or predetermined acceleration rate to the at least one estimated deceleration rate or estimated acceleration rate.

Variation 5 may include a product as in any of variations 1 through 4, wherein determining that the flagged event is non-routine includes calculating at least one of an estimated lateral deceleration rate or an estimated lateral acceleration rate; and comparing at least one of a predetermined lateral deceleration rate or predetermined lateral acceleration rate to the at least one estimated lateral deceleration rate or estimated lateral acceleration rate.

Variation 6 may include a product as in any of variations 1 through 5, wherein communicating the initiated control action via human-machine-interface to vehicle occupants includes tightening of at least one seat belt within the vehicle.

Variation 7 may include a product as in any of variations 1 through 6, wherein communicating the initiated control action via human-machine-interface to vehicle occupants includes illumination of at least one light source within the vehicle.

Variation 8 may include a product as in any of variations 1 through 7, wherein communicating the initiated control action via human-machine-interface to vehicle occupants includes providing at least one audio cue within the vehicle.

Variation 9 may include a product as in any of variations 1 through 8, wherein communicating the initiated control action via human-machine-interface to vehicle occupants includes displaying intending control action on a graphical user interface of a display within a vehicle dash.

Variation 10 may include a product as in any of variations 1 through 9, wherein communicating the initiated control action via human-machine-interface to vehicle occupants includes vibrating a vehicle seat or portion of a seat to indicate lateral movement control actions.

According to variation 11, a product may include at least one controller; a memory that stores computer-executable components; and a processor that executes the computer-executable components stored in the memory. The computer-executable components may include determining that at least one control action is required for continuing function and travel of a vehicle; flagging the need for control action as an event; determining the at least one control action to continue function and travel of the vehicle, wherein the act least one control action includes at least one actuator command communicated to at least one an electronic steering system, a traction control system, an electronic braking system, a propulsion system, or an advanced driver assistance system; initiating performing the at least one control action; assessing the severity of the flagged event. The computer-executable components may further include determining that the flagged event is non-routine including calculating at least one of an estimated deceleration rate or an estimated acceleration rate; comparing at least one of a predetermined deceleration rate or predetermined acceleration rate to the at least one estimated deceleration rate or estimated acceleration rate; monitoring vehicle occupant attention via at least one passenger tracking input comprising tracking at least one of vehicle occupant head position or eye movement; and communicating the initiated control action via human-machine-interface to vehicle occupants including at least one of illumination of at least one light source within the vehicle, providing at least one audio cue within the vehicle, displaying intending control action on a graphical user interface of a display within a vehicle dash, or vibrating a vehicle seat or portion of a seat to indicate lateral movement control actions.

Variation 12 may include a product as in variation 11, wherein determining that the flagged event is non-routine may include calculating at least one of an estimated lateral deceleration rate or an estimated lateral acceleration rate; and comparing at least one of a predetermined lateral deceleration rate or predetermined lateral acceleration rate to the at least one estimated lateral deceleration rate or estimated lateral acceleration rate.

According to variation 13, a method may include determining that a control action is required for continuing function and travel of a vehicle; flagging the need for control action as an event; determining the control action to continue function and travel of the vehicle; initiating performing the control action; assessing the severity of the flagged event; determining that the flagged event is non-routine; monitoring vehicle occupant attention via at least one passenger tracking input comprising tracking at least one of vehicle occupant head position or eye movement; and communicating the initiated control action via human-machine-interface to vehicle occupants.

Variation 14 may include a method as in variation 13, wherein the controller is in operable communication with at least one of an electronic steering system, a traction control system, an electronic braking system, a propulsion system, or advanced driver assistance system.

Variation 15 may include a method as in any of variations 13 through 14, wherein initiating performing the at least one control action includes communicating at least one actuator command to the at least one electronic steering system, traction control system, electronic braking system, propulsion system, or advanced driver assistance system.

Variation 16 may include a method as in any of variations 13 through 15, wherein communicating the initiated control action via human-machine-interface to vehicle occupants includes at least one of illumination of at least one light source within the vehicle, providing at least one audio cue within the vehicle, displaying intending control action on a graphical user interface of a display within a vehicle dash, or vibrating a vehicle seat or portion of a seat to indicate lateral movement control actions.

Variation 17 may include a method as in any of variations 13 through 16, wherein the at least one control action is a plurality of control actions.

Variation 18 may include a method as in any of variations 13 through 17, wherein determining that the flagged event is non-routine includes determining that the at least one control action to continue function and travel of the vehicle would create at least one of high anxiety, sensory overload, or sensory fatigue in vehicle occupants.

Variation 19 may include a method as in any of variations 13 through 16, wherein determining that the flagged event is non-routine includes calculating at least one of an estimated deceleration rate or an estimated acceleration rate; and comparing at least one of a predetermined deceleration rate or predetermined acceleration rate to the at least one estimated deceleration rate or estimated acceleration rate.

Variation 20 may include a method as in any of variations 13 through 19, wherein determining that the flagged event is non-routine includes calculating at least one of an estimated lateral deceleration rate or an estimated lateral acceleration rate; and comparing at least one of a predetermined lateral deceleration rate or predetermined lateral acceleration rate to the at least one estimated lateral deceleration rate or estimated lateral acceleration rate.

The above description of select variations within the scope of the invention is merely illustrative in nature and, thus, variations or variants thereof are not to be regarded as a departure from the spirit and scope of the invention.

What is claimed is:

1. A product comprising:
   at least one controller;
   a memory that stores computer-executable components;
   a processor that executes the computer-executable components stored in the memory, wherein the computer-executable components comprise:

storing at least one prior vehicle control action;
determining that at least one vehicle control action is required for continuing function and travel of a vehicle;
flagging the required at least one vehicle control action as an event;
determining the at least one vehicle control action to continue function and travel of the vehicle;
determining that the at least one vehicle control action would create high anxiety, sensory overload, or sensory fatigue of an occupant of the vehicle;
initiating the at least one vehicle control action;
assessing the severity of the flagged event;
determining that the flagged event is non-routine;
monitoring vehicle occupant attention via at least one passenger tracking input;
determining that the at least one prior vehicle control action resulted in increased occupant anxiety; and
communicating, prior to initiation of the at least one vehicle control action, via a human-machine interface (HMI) system that the at least one vehicle control action is about to be active within a vehicle.

2. A product as in claim 1, further comprising completing the at least one vehicle control action, and monitoring occupant emotions or facial features or expressions, or other bodily indicators that can indicate anxiety levels.

3. A product as in claim 1, wherein determining that the flagged event is non-routine comprises determining that the at least one vehicle control action to continue function and travel of the vehicle would create at least one of high anxiety, sensory overload, or sensory fatigue in vehicle occupants.

4. A product as in claim 1, wherein determining that the flagged event is non-routine comprises:
calculating at least one of an estimated deceleration rate or an estimated acceleration rate; and
comparing at least one of a predetermined deceleration rate or predetermined acceleration rate to the at least one estimated deceleration rate or estimated acceleration rate.

5. A product as in claim 1, wherein determining that the flagged event is non-routine comprises:
calculating at least one of an estimated lateral deceleration rate or an estimated lateral acceleration rate; and
comparing at least one of a predetermined lateral deceleration rate or predetermined lateral acceleration rate to the at least one estimated lateral deceleration rate or estimated lateral acceleration rate.

6. A product as in claim 1, wherein communicating the initiated at least one vehicle control action via human-machine-interface to vehicle occupants comprises tightening of at least one seat belt within the vehicle.

7. A product as in claim 1, wherein communicating the initiated at least one vehicle control action via human-machine-interface to vehicle occupants comprises illumination of at least one light source within the vehicle.

8. A product as in claim 1, wherein communicating the initiated at least one vehicle control action via human-machine-interface to vehicle occupants comprises providing at least one audio cue within the vehicle.

9. A product as in claim 1, wherein communicating the initiated at least one vehicle control action via human-machine-interface to vehicle occupants comprises displaying intending control action on a graphical user interface of a display within a vehicle dash.

10. A product as in claim 1, wherein communicating the initiated control action via human-machine-interface to vehicle occupants comprises vibrating a vehicle seat or portion of a seat to indicate lateral movement control actions and wherein the vehicle control action comprises communicating an actuator command.

11. A product comprising:
at least one controller;
a memory that stores computer-executable components;
a processor that executes the computer-executable components stored in the memory, wherein the computer-executable components comprise:
determining that at least one vehicle control action is required for continuing function and travel of a vehicle;
flagging the required at least one vehicle control action as an event;
determining that the at least one control action is required to continue function and travel of the vehicle, wherein the at least one vehicle control action comprises at least one actuator command communicated to at least one of an electronic steering system, a traction control system, an electronic braking system, a propulsion system, or an advanced driver assistance system;
determining that the vehicle control action would create high anxiety, sensory overload, or sensory fatigue of an occupant of the vehicle;
initiating the at least one vehicle control action;
assessing the severity of the flagged event;
determining that the flagged event is non-routine comprising:
calculating at least one of an estimated deceleration rate or an estimated acceleration rate;
comparing at least one of a predetermined deceleration rate or predetermined acceleration rate to the at least one estimated deceleration rate or estimated acceleration rate;
monitoring vehicle occupant attention via at least one passenger tracking input comprising tracking at least one of vehicle occupant head position or eye movement; and
communicating, prior to initiation of the at least one vehicle control action, via human-machine-interface that a vehicle control is about to be active within a vehicle to vehicle occupants comprising at least one of illumination of at least one light source within the vehicle, providing at least one audio cue within the vehicle, displaying intending control action on a graphical user interface of a display within a vehicle dash, or vibrating a vehicle seat or portion of a seat to indicate lateral movement control actions.

12. A product as in claim 11, wherein determining that the flagged event is non-routine comprises:
calculating at least one of an estimated lateral deceleration rate or an estimated lateral acceleration rate; and
comparing at least one of a predetermined lateral deceleration rate or predetermined lateral acceleration rate to the at least one estimated lateral deceleration rate or estimated lateral acceleration rate.

13. A method comprising:
determining that at least one vehicle control action is required for continuing function and travel of a vehicle, wherein the at least one vehicle control action comprises at least one of decelerating, accelerating, or moving a vehicle laterally;
flagging the required at least one vehicle control action as an event;
determining that the at least one vehicle control action would create high anxiety, sensory overload, or sensory fatigue of an occupant of the vehicle;
assessing the severity of the flagged event;

determining that the flagged event is non-routine;

monitoring vehicle occupant attention via at least one passenger tracking input; and communicating, prior to initiation of the at least one vehicle control action, the initiated at least one vehicle control action is about to be active within a vehicle via human-machine-interface to vehicle occupants and thereafter initiating the at least one vehicle control action.

14. A method as in claim 13, wherein the controller is in operable communication with at least one of an electronic steering system, a traction control system, an electronic braking system, a propulsion system, or advanced driver assistance system.

15. A method as in claim 14, wherein initiating the at least one vehicle control action comprises communicating at least one actuator command to the at least one electronic steering system, traction control system, electronic braking system, propulsion system, or advanced driver assistance system.

16. A method as in claim 13, wherein communicating the initiated at least one vehicle control action via human-machine-interface to vehicle occupants comprises at least one of illumination of at least one light source within the vehicle, providing at least one audio cue within the vehicle, displaying intending control action on a graphical user interface of a display within a vehicle dash, or vibrating a vehicle seat or portion of a seat to indicate lateral movement control actions.

17. A method as in claim 13, wherein monitoring vehicle occupant attention via at least one passenger tracking input comprises tracking vehicle occupant head position.

18. A method as in claim 13, wherein determining that the flagged event is non-routine comprises determining that the at least one vehicle control action to continue function and travel of the vehicle would create at least one of high anxiety, sensory overload, or sensory fatigue in vehicle occupants.

19. A method as in claim 13, wherein determining that the flagged event is non-routine comprises:

calculating at least one of an estimated deceleration rate or an estimated acceleration rate; and comparing at least one of a predetermined deceleration rate or predetermined acceleration rate to the at least one estimated deceleration rate or estimated acceleration rate.

20. A method as in claim 13, wherein determining that the flagged event is non-routine comprises:

calculating at least one of an estimated lateral deceleration rate or an estimated lateral acceleration rate; and comparing at least one of a predetermined lateral deceleration rate or predetermined lateral acceleration rate to the at least one estimated lateral deceleration rate or estimated lateral acceleration rate.

* * * * *